United States Patent
Xiao (10) Patent No.: US 12,081,682 B2
(45) Date of Patent: Sep. 3, 2024

(54) METHOD FOR DETERMINING MAIN CHAIN OF BLOCKCHAIN, DEVICE, AND STORAGE MEDIUM

(71) Applicant: BAIDU ONLINE NETWORK TECHNOLOGY (BEIJING) CO., LTD., Beijing (CN)

(72) Inventor: Wei Xiao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 1084 days.

(21) Appl. No.: 16/962,713

(22) PCT Filed: Jan. 18, 2019

(86) PCT No.: PCT/CN2019/072335
§ 371 (c)(1),
(2) Date: Jul. 16, 2020

(87) PCT Pub. No.: WO2019/210711
PCT Pub. Date: Nov. 7, 2019

(65) Prior Publication Data
US 2020/0358812 A1    Nov. 12, 2020

(30) Foreign Application Priority Data
May 2, 2018 (CN) .......................... 201810411049.4

(51) Int. Cl.
*H04L 9/00* (2022.01)
*H04L 9/32* (2006.01)
*G06Q 30/018* (2023.01)

(52) U.S. Cl.
CPC .............. *H04L 9/50* (2022.05); *H04L 9/3239* (2013.01); *G06Q 30/0185* (2013.01)

(58) Field of Classification Search
None
See application file for complete search history.

(56) References Cited

U.S. PATENT DOCUMENTS 9,875,510 B1    1/2018   Kasper
2017/0323392 A1*  11/2017   Kasper .................. H04L 63/123
(Continued)

FOREIGN PATENT DOCUMENTS

CN    105931052 A    9/2016
CN    106530088 A    3/2017
(Continued)

OTHER PUBLICATIONS

International Search Report for PCT/CN2019/072335, dated Apr. 16, 2019, 21 pages.
(Continued)

*Primary Examiner* — Syed A Roni
(74) *Attorney, Agent, or Firm* — Lippes Mathias LLP (57) ABSTRACT

A method for determining a main chain of a blockchain, a device, and a storage medium. The method comprises: determining, on the basis of a detection result that it is detected that a blockchain has at least two fork chains, weights of blocks in the fork chains (110); determining, on the basis of the weights of the blocks comprised in the fork chains, the weights of the fork chains (120); and determining a main chain from the fork chains on the basis of the weights of the fork chains, and rolling back the fork chains except for the main chain (130).

12 Claims, 2 Drawing Sheets

--- determining a weight of each block in each fork chain of the blockchain in response to detecting that at least two fork chains exist in the blockchain ~110 determining a weight of each fork chain according to the weight of each block included in the fork chain ~120 determining a main chain from the fork chains according to the weight of each fork chain, and rolling back the fork chains except for the main chain ~130

(56) References Cited

U.S. PATENT DOCUMENTS

2018/0089683 A1  3/2018 Setty et al.
2018/0114218 A1  4/2018 Konik et al.
2019/0306190 A1* 10/2019 Suraparaju ............... H04L 9/50

FOREIGN PATENT DOCUMENTS

CN   107507006 A   12/2017
CN   108647963 A   10/2018
JP   2017091148 A   5/2017

OTHER PUBLICATIONS

Office Action for Chinese Application No. 201810411049.4, dated Nov. 29, 2019, 10 pages.
Office Action for Japanese Application 2020-528263, dated Jun. 15, 2021, 3 pages.

* cited by examiner

METHOD FOR DETERMINING MAIN CHAIN OF BLOCKCHAIN, DEVICE, AND STORAGE MEDIUM

CROSS-REFERENCE TO RELATED THE PRESENT DISCLOSURE

The present disclosure is a U.S. National phase of International Application No. PCT/CN2019/072335 filed on Jan. 18, 2019, which claims priority to Chinese Patent Application No. 20181041049.4 filed on May 2, 2018, the entire contents of which are incorporated herein by reference.

TECHNICAL FIELD

The present disclosure relates to a field of blockchain technologies, and more particularly to a method and an apparatus for determining a main chain of a blockchain, a device, and a storage medium.

BACKGROUND

With the continuous development of Internet technology, a decentralized, open and transparent blockchain technology came into being. In the blockchain technology, data blocks are used to break a current dependence of the Internet on central servers. All data generated in the network will be recorded by a node that currently has a transaction processing right, and data is broadcast and other nodes are verified, to form a block and to connect the block to an end of the blockchain. Almost every node in the network is capable of observing data in each block throughout the network, so that all nodes may supervise the network data, thus ensuring safety and reliability of the data in the network.

At present, each node in the network may compete for the transaction processing right or a block generating right via a consensus mechanism. If two nodes each competes for the transaction processing right or the block generating right at almost the same time, these two nodes form their respective blocks and gradually transmit block data to the entire network. During the transmission of two pieces of block data, other nodes in the network may first receive data from any one of these two blocks. Since each of the two blocks is an extension of the main chain, a part of nodes will extend the blockchain based on one block received, and the remaining nodes will extend the blockchain based on another block received. In this way, the blockchain will fork out two fork chains with a competitive relation with each other. In order to ensure the uniqueness of blockchain data in the network, the related technology uses a consensus algorithm based on the longest chain, i.e., the longest fork chain is always regarded as a correct chain and determined as a main chain, while block data of the remaining fork chains are considered to be invalid.

However, for a method for determining a main chain based on the longest chain, there may be a situation where the fork chain is actually a wrong chain although it is the longest chain. For example, a malicious end improves the computing ability of its nodes, competes for the transaction processing rights of multiple blocks in advance, maliciously increases and prolongs the fork chain that is beneficial to the malicious end, so that the correct fork chain is discarded and a malicious attack on the blockchain is achieved.

SUMMARY

The following is an overview of the subject matter as described in detail herein. The summary is not intended to limit the protection scope of the claims.

A method and an apparatus for determining a main chain of a blockchain, a device, and a storage medium are provided by the present disclosure, which may effectively determine the main chain of the blockchain from fork chains, thus reducing a success rate of a malicious attack.

In a first aspect, a method for determining a main chain of a blockchain is provided by the present disclosure. The method includes:
 determining a weight of each block in each fork chain of the blockchain in response to detecting that at least two fork chains exist in the blockchain;
 determining a weight of each fork chain according to the weight of each block included in the fork chain; and
 determining a main chain from the fork chains according to the weight of each fork chain, and rolling back the fork chains other than the main chain.

In a second aspect, an apparatus for determining a main chain of a blockchain is provided by the present disclosure. The apparatus includes:
 a block weight determining module, configured to a weight of each block in each fork chain of the blockchain in response to detecting that at least two fork chains exist in the blockchain;
 a fork chain weight determining module, configured to determine a weight of each fork chain according to the weight of each block included in the fork chain; and
 a main chain determining module, configured to determine a main chain from the fork chains according to the weight of each fork chain, and roll back the fork chains other than the main chain.

In a third aspect, a device is provided by the present disclosure. The device includes:
 one or more processors;
 a memory configured to store one or more programs;
 when the one or more programs are executed by the one or more processors, the one or more processors are caused to carry out the method for determining the main chain of the blockchain according to any embodiment of the present disclosure.

In a fourth aspect, a computer-readable storage medium is provided by the present disclosure. The computer-readable storage medium has a computer program stored thereon. The program is configured to, when executed by a processor, carry out the method determining the main chain of the blockchain according to any embodiment of the present disclosure.

In the embodiments of the present disclosure, when a fork chain is generated for a blockchain, different weights are set for respective blocks in the fork chains to obtain a weight of each fork chain. According to the weight of each fork chain, a main chain is determined from the fork chains and the fork chains except for the main chain are rolled back. In the embodiments of the present disclosure, by setting different weights for blocks in the fork chains according to the specific conditions of the fork chains, the actual weight of each block in the blockchain is reasonably allocated in advance, thus determining the main chain from the fork chains based on the weights of the fork chains and improving rationality of the determining of the main chain. And the problem of malicious discarding of a tail block of a previous block generation node by a current block generation node during switching of the block generation node is avoided to a certain extent, so that a cost for a malicious attack of the current block generation node is increased, and a success rate of a malicious attack is reduced.

After reading and understanding the drawings and detailed description, other aspects may be understood.

DETAILED DESCRIPTION

Embodiments of the present disclosure will be further described in detail below in conjunction with the drawings and embodiments. It may be understood that the specific embodiments described herein are only used to explain the embodiments of the present disclosure, rather than limiting the present disclosure. In addition, it should be noted that, for ease of description, the drawings only show parts of, but not all structures related to the embodiments of the present disclosure.

Embodiment 1

Figure 1:
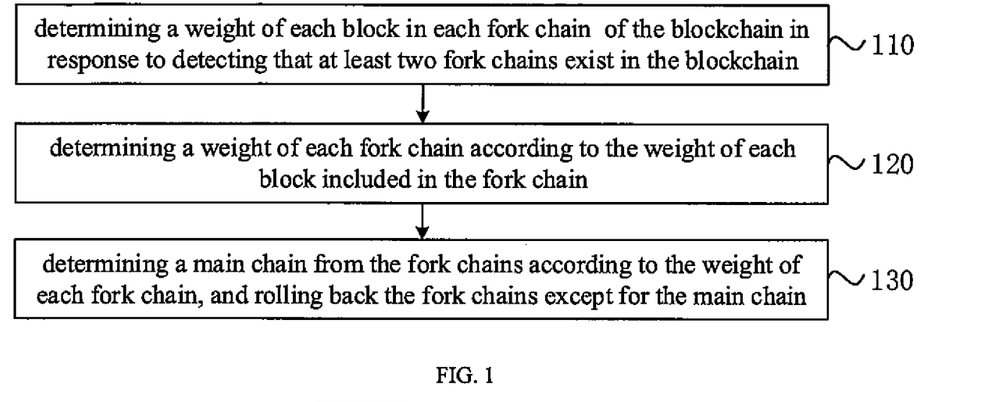
FIG. 1 is a flowchart of a method for determining a main chain of a blockchain provided in Embodiment 1 of the present disclosure.

FIG. 1 is a flowchart of a method for determining a main chain of a blockchain provided in Example 1 of the present disclosure. This embodiment may be applied to a situation where a fork chain is generated in the blockchain to determine a main chain. The method may be executed by an apparatus for determining a main chain of a blockchain, which may be configured in a node of a blockchain system that has a storage authority of storing the blockchain. The method specifically includes the followings.

At block S110, a weight of each block in each fork chain of the blockchain is determined in response to detecting that at least two fork chains exist in the blockchain.

In this embodiment, the block data in each block of the blockchain not only includes transaction data recorded in the block, but also includes block header information, for example, block identification information such as a hash value of a previous block header, a time stamp (i.e., generating time of the block), workload difficulty and a Merkle root (i.e., reliability tree). The supervision of all nodes on the network data may be achieved since almost every node in the network is possible to observe the data of each block in the entire network. Therefore, nodes in the blockchain system that have the authority of storing the blockchain may detect whether there is a fork chain. If any node detects that there are at least two fork chains in the blockchain, it needs to determine the main chain from the at least two fork chains. Specifically, it may be determined whether a fork chain is generated as follows: if it is detected that a time difference between time stamps in at least two blocks is less than a certain time threshold, the generating time of the at least two blocks is very close; or if it is detected that the hash values of the previous block headers in at least two blocks are the same, it is considered that a fork chain is generated in the blockchain. This embodiment does not limit a way for detecting the bifurcation phenomenon, and any way adapt to detect the bifurcation phenomenon of blockchain may be applied to this embodiment. Any one of the above methods for detecting the fork chain may be used, or according to the actual situation, a combination of at least two of them may be used to detect the fork chain.

Figure 2:
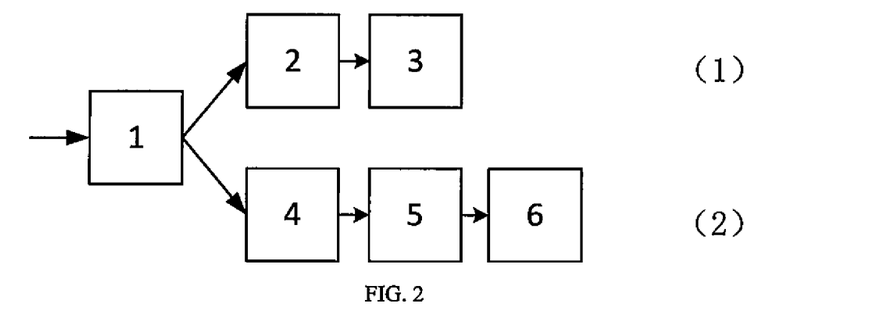
FIG. 2 is an example diagram of a fork chain provided in Embodiment 1 of the present disclosure.

Specifically, in this embodiment, a fork block refers to a tail block of the blockchain before the bifurcation phenomenon occurs, i.e., the bifurcation phenomenon occurs behind the fork block. Correspondingly, the fork chain is extended by using the next block of the fork block as a starting block of the fork chain. FIG. 2 is an example diagram of a fork chain. As shown in FIG. 2, a bifurcation phenomenon occurs behind the block 1, which is a fork block; the block 2 is a starting block of the fork chain (1), the block 2 and the subsequent block 3 constitute the current fork chain (1); the block 4 is a starting block of the fork chain (2), the block 4 and the subsequent blocks 5 and 6 constitute the current fork chain (2). When the starting block of the fork chain is successfully merged into the blockchain (i.e., the bifurcation phenomenon occurs), since different nodes follow different starting fork blocks to extend the blockchain, at least two different fork chains forked out have different hashrates, and further the at least two fork chains have also different growth rates. After a period of time, blocks on different fork chains have different transaction requests stored thereon.

Therefore, in this embodiment, in order to ensure the uniqueness of blockchain data in the network, when the bifurcation phenomenon is detected or when the block generation node completes processing and recording of transaction requests for a certain period or of a certain number, it starts to detect and judge the block information included in each fork chain, so that all nodes in the blockchain may follow a unified block weight setting algorithm, which may be used to set different weights for blocks in the fork chain according to a specific weight setting rule, so as to select a main chain according to the weight of the fork chain. Exemplarily, based on multi-dimensional information such as an association relationship between each block in the fork chain, a workload difficulty and timestamp of each block, and the block generation node to which each block belongs, when the block information in the fork chain meets a preset condition (for example, it meets a certain attack type of blockchain), the weight for each block in each fork chain may be set according to a weight setting rule corresponding to the preset condition. In this way, different weights are set for blocks in the fork chain, such that the importance of each block located in the fork chains is reasonably allocated, thus avoiding a situation where an unreasonable malicious attack extends a length of the fork chain.

In this embodiment, for the setting of weights for the block meeting a certain attack type of blockchain, various attack types of blockchain may be analyzed based on the multi-dimensional information such as the association relationship between each block in the fork chain, the workload difficulty and timestamp of each block, and the block generation node to which each block belongs, and a forming condition of the attack type is determined according to an association relationship between attack types and block information, then the forming condition is used as a preset condition to detect and determine the attack type to which the fork chain belongs, so that the weight for each block in the fork chain is set specifically according to the attack type, i.e., the association relationship between attack types and weight setting rules is generated. Specifically, in this embodiment, it may also be determined whether there is a phenomenon of maliciously discarding blocks according to the block information of the fork chain. For example, the malicious end controls one node with a strong hashrate, which generates more blocks to form and extend the fork chain to maliciously discard the correct block. That is, it is possible to detect a certain number of blocks which follow the starting fork block of the fork chain and are generated from the same node as the block generation node of the starting fork block. Therefore, the weight of the block formed by the malicious end node is set to be a lower value, or even 0, so as to reduce the weight of the block in the longer fork chain generated by the malicious end.

Exemplarily, as shown in FIG. 2, it is assumed that blocks 1, 2, and 3 are blocks generated by the previous block generation node A, and blocks 4, 5, and 6 are blocks generated by the current block generation node B. If a certain node in the blockchain system detects that the hash values of a previous block header in blocks 2 and 4 are the same by observing the block data of each block in the network, it is determined that the previous block of blocks 2 and 4 is the same block (i.e., block 1), so it is determined that the bifurcation phenomenon occurs in the blockchain. All nodes in the blockchain system may follow a unified block weight setting algorithm to detect the block information on the two fork chains, and different weights for blocks in the fork chains are set according to the block information on the two fork chains.

In the above example, it is assumed that node B is the node controlled by the malicious end for attacking, the malicious end forms and extends a fork chain (2) behind the block 1, in order to discard the transaction data recorded by node A in blocks 2 and 3. Therefore, in order to prevent the fork chain (2) from directly determined as a main chain due to a longer length of the fork chain (2), this embodiment sets the weight for each block according to the block information in the fork chain. Furthermore, the weight setting rule associated with the malicious attack based on the longest chain may be set as follows: the weights of two starting fork blocks are set to be 1, if the block generation node of the blocks behind the starting fork block in the first fork chain is different from that of the starting fork block, then the weights of these blocks may be set to be 1, while the weights of the blocks behind the starting fork block in the second fork chain are set to be 0, so as to invalidate the block used for a double-spend attack. Therefore, according to the association relationship between attacks of maliciously discarding the blocks and the weight setting rules as well as a connection of subsequent blocks in the fork chain, the determination of the weight for each block in each fork chain is completed.

At block S120, a weight of each fork chain is determined according to the weight of each block included in the fork chain.

In this embodiment, the weight of each fork chain is determined based on the weight of each block in the fork chain. The weight of each block included in the fork chain may be summed to obtain the weight of the fork chain, which is used as a judgment of the fork chain, instead of simply judging a degree of recognition of each fork chain by means of the number of blocks included in the fork chain.

Exemplarily, in the above example of the malicious attack based on the longest chain, since such attacks usually occur in the case of switching nodes, the subsequent blocks of the fork chain (1) are generated by a new node and are merged into the fork chain, resulting in that the weight of the fork chain (1) is greater than 1. Because a malicious node maliciously extends the fork chain (2), the blocks in the fork chain (2) have the same block generation node (i.e., the malicious node), so that the weights of blocks except for the starting block in the fork chain (2) are all set to be 0 and the weight of the fork chain (2) is only 1.

At block S130, a main chain is determined from the fork chains according to the weight of each fork chain, and the fork chains except for the main chain are rolled back.

In this embodiment, the weight of the block is equivalent to the degree of recognition of the block by the network due to the setting of the weight of the block, so that a fork chain with the largest weight may be determined from all the fork chains as a main chain of the blockchain according to the weight of each fork chain. In order to ensure the uniqueness of the blockchain data in the network, all the fork chains except for the fork chain selected as the main chain are considered to be invalid, and the transaction data thereof is restored to the main chain that was regarded to be correct last time.

Exemplarily, in the above example of a malicious attack based on the longest chain, since the weight of the fork chain (1) is greater than 1 while the weight of the fork chain (2) is only 1, the weight of the fork chain (1) is greater than that of the fork chain (2), so that the fork chain (1) is determined to be the main chain of the blockchain, thus avoiding that the fork chain (2) with more blocks (i.e., the longest chain) is directly determined to be the main chain. Since it is taken a lot of work to compete for transaction processing rights or block generation rights and process the transaction data, which can be done by overcoming a higher workload difficulty, different weights for the blocks are set. The method for determining a main chain based on the block weights is beneficial to increase the cost of attacking the blockchain by the malicious end and reduce the success rate of an attack from the malicious end without affecting the extension of the normal blockchain.

Notably, this embodiment is an example of setting the block weights when there is an attack in the bifurcation phenomenon, and this embodiment may also be applied to set the block weights in the fork chain when there is no attack in the bifurcation phenomenon. Therefore, this embodiment is applicable to all situations in the bifurcation phenomenon, regardless of for a normal node or an aggressive malicious node. All nodes in the blockchain system may follow a unified block weight setting algorithm in the fork chain, the method for determining the main chain based on the weight of the fork chain may be achieved when the bifurcation phenomenon occurs in the blockchain system.

In the technical solution of this embodiment, different weights are set for blocks in the fork chain when the fork chain is generated by the blockchain to obtain the weight of each fork chain. Based on the weight of each fork chain, the main chain is determined from the fork chains, and the fork chains except for the main chain are rolled back. In this embodiment, by setting different weights for blocks in the fork chains according to the specific conditions of the fork chains, the actual weight of each block in the blockchain is reasonably allocated in advance, so that the main chain may be determined from the fork chains based on the weights of the fork chains, thus improving the rationality of determining the main chain. And the problem of malicious discarding of a tail block of a previous block generation node by a current block generation node during switching of the block generation node is avoided to a certain extent, so that a cost for a malicious attack of the current block generation node is increased, and a success rate of a malicious attack is reduced.

Embodiment 2

Figure 3:
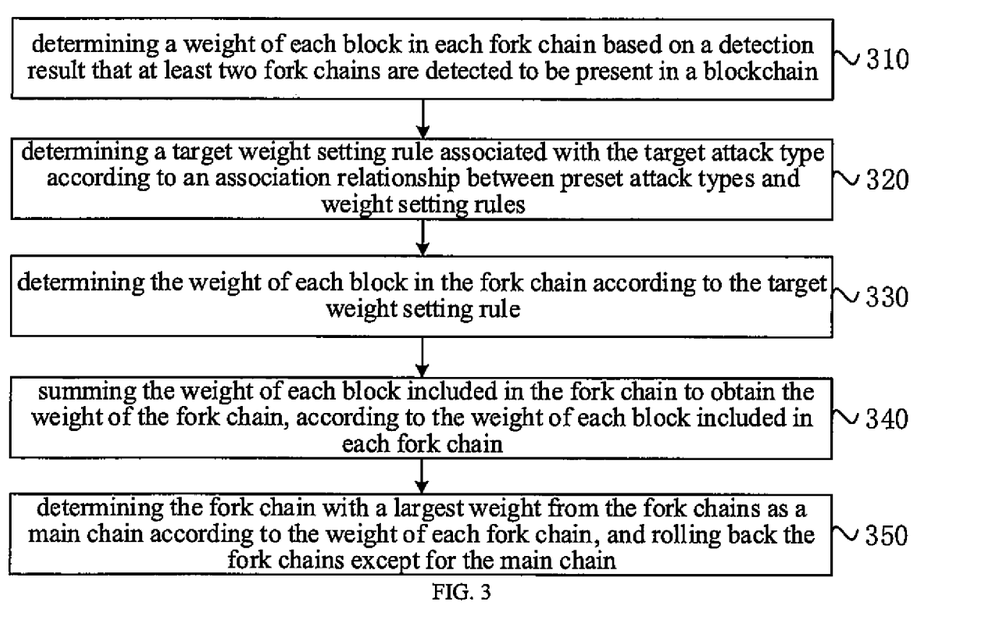
FIG. 3 is a flowchart of a method for determining a main chain of a blockchain provided in Embodiment 2 of this the present disclosure.

A preferred embodiment of the method for determining a main chain of a blockchain is provided by this embodiment on the basis of the Embodiment 1 described above, which may set corresponding weights according to an attack type. FIG. 3 is a flowchart of a method for determining a main chain of a blockchain provided in Embodiment 2 of the present disclosure. As shown in FIG. 3, the method includes the following specific steps.

At block S310, a target attack type is determined according to block information included in each fork chain, in response to detecting that at least two fork chains exist in the blockchain.

In this embodiment, since the malicious end's attack aims to make its illegal transaction data effective to profit from it, most of the common attack types belong to an attacking manner of a method for determining a main chain based on the longest chain, such as a double-spend attack. The illegal fork chain of the malicious end is extended as the longest chain, thereby discarding the correct block in the blockchain. Based on the multi-dimensional information such as the association relationship between each block in the fork chain, the workload difficulty and timestamp of each block, and the block generation node to which each block belongs, various attack types of blockchain may be analyzed. The forming condition of the attack type is determined according to the association relationship between attack types and block information.

In this embodiment, the supervision of all nodes on the network data may be achieved since almost every node in the network is possible to observe the data of each block in the entire network. Therefore, nodes in the blockchain system that have the authority of storing the blockchain may detect whether there is a fork chain. If any node detects that there are at least two fork chains in the blockchain, it needs to determine the main chain from the at least two fork chains. Specifically, it may be determined whether a fork chain is generated as follows: if it is detected that a time difference between time stamps in at least two blocks is less than a certain time threshold, the generating time of the at least two blocks is very close; or if it is detected that the hash values of the previous block headers in at least two blocks are the same, it is considered that a fork chain is generated in the blockchain. Any one of the above methods for detecting the fork chain may be used, or according to the actual situation, a combination of at least two of them may be used to detect the fork chain. Further, when a bifurcation phenomenon is detected, or when the block generation node completes processing and recording of transaction requests for a certain period or of a certain number, it starts to detect and judge the block information included in each fork chain. Based on the forming condition of each attack type and the multi-dimensional information such as the association relationship between each block in the fork chain, the workload difficulty and timestamp of each block, and the block generation node to which each block belongs, the target attack type from which the fork chain is suffered is determined.

Exemplarily, the double-spend attack may also be called a double-pay attack. As the name implies, the malicious end may use only one sum of money to complete two spends, or get back the money that has been spent. Specifically in the Bitcoin transfer scenario, when the first transfer transaction data performed in the main chain is confirmed to form a block, the malicious end, in order to invalidate this transaction, will strive for multiple consecutive transaction processing rights in the shortest time to conduct a second transaction, so as to generate a fork from a previous block of the first transaction block, to use the prepared blocks for extending the fork corresponding to the first transaction and changing the fork to be a main chain, and to invalidate the first transfer transaction. Therefore, the forming condition of the double-spend attack may be as follows: in the Bitcoin transfer scenario, when two fork chains are generated, if the starting fork blocks in the two fork chains have the same the block generation node, and the block generation node of the blocks behind the starting fork block on one of fork chains is also the above block generation node, in this case, it may be determined that the target attack type on the fork chain is a double-spend attack.

At block S320, a target weight setting rule associated with the target attack type is determined according to an association relationship between preset attack types and weight setting rules.

In this embodiment, the attack type to which the fork chain belongs is detected and judged according to the forming condition of each attack type, so that the weight for each block in the fork chain is set specifically according to the attack type, i.e., an association relationship between attack types and the weight setting rules is generated to suppress or prevent an attack from the malicious end, increase the attacking cost of the malicious end, and reduce the success rate of the attack.

Exemplarily, according to the forming condition of the double-spend attack and harm it brings, the weight setting rule associated with the double-spend attack may be set as follows: for any block in the fork chain, if the block generation node of the block is different from that of a previous block of the block, the weight of the block is set to be 1; if the block generation node of the block is the same as that of the previous block of the block, and the previous block of the block is a fork block, the weight of the block is set to be 1; if the block generation node of the block is the same as the that of the previous block of the block, and the previous block of the block is not a fork block, then the weight of this block is set to be 0.

At block S330, the weight of each block in the fork chain is determined according to the target weight setting rule.

In this embodiment, according to the target weight setting rule, the corresponding weight is set for each block in the fork chain that meets the target weight setting rule.

In an embodiment, for most of the attacking manners of maliciously discarding blocks based on the longest chain, the following general settings of weights may be performed: for any current block in the fork chain, if the block generation node of the current block in the fork chain is different from that of the previous block of the current block, then the weight of the current block is set as a first value; if the block generation node of the current block is the same as that of the previous block of the current block and the previous block is a fork block, then the weight of the current block is set as a first value; if the block generation node of the current block is the same as that of the previous block of the current block and the previous block is not a fork block, then the weight of the current block is set as a second value; where the first value is greater than the second value.

In this embodiment, it may be understood that, through the above-mentioned identification of attack types, the correct block in the fork chain is set with a larger weight and the wrong block in the fork chain is set with a smaller weight according to block information in the fork chain. Different weights for the blocks in the fork chain are set, in order to effectively reduce or even eliminate the degree of recognition of a malicious block, thereby invalidating the fork chain which is maliciously extended by the malicious end and further protecting the correct block in the blockchain.

At block S340, the weight of each block included in the fork chain is summed to obtain the weight of the fork chain, according to the weight of the block included in the fork chain.

In this embodiment, the weight of each fork chain is determined based on the weight of each block in the fork chain. The weight of each block included in the fork chain may be summed to obtain the weight of the fork chain, which is used as a judgment of the fork chain, instead of simply judging a degree of recognition of each fork chain by means of the number of blocks included in the fork chain.

At block S350, the fork chain with a largest weight from the fork chains is determined as a main chain according to the weight of each fork chain, and the fork chains except for the main chain are rolled back.

In this embodiment, the weight of the block is equivalent to the degree of recognition of the block by the network due to the setting of the weight of the block, so that the fork chain with the largest weight may be determined from all the fork chains as a main chain of the blockchain according to the weight of each fork chain. In order to ensure the uniqueness of the blockchain data in the network, all the fork chains except for the fork chain selected as the main chain are considered to be invalid, and the transaction data thereof is restored to the main chain that was regarded to be correct last time.

In the technical solution of this embodiment, when a fork chain is generated by the blockchain, or when the block generation node finishes processing and recording of transaction requests for a certain period or of a certain number, the target weight setting rule associated with the target attack type is determined by identifying the target attack type to which the fork chain belongs, so as to set different weights for blocks in the fork chain according to the target weight setting rule. Alternatively, the block weight is set for the fork chain that is identified to be in correspondence with the attacking manner of maliciously discarding the block based on the longest chain, by utilizing a general weight setting rule. Thus, the weight of each fork chain is obtained, so that the fork chain with the largest weight is determined as the main chain, and the transaction data in the fork chains except for the main chain is rolled back. In this embodiment, by determining the attack type to which the fork chain belongs and the weight setting rule, the corresponding weight is set for each block in the fork chain, so as to reduce or even eliminate the degree of recognition of illegal blocks, thereby invalidating the fork chain which is specifically extended by the malicious end and further protecting the correct block in the blockchain. The main chain may be determined from the fork chains based on the weights of the fork chains. The problem of malicious discarding of a tail block of a previous block generation node by a current block generation node during switching of the block generation node is avoided to a certain extent, so that the cost for a malicious attack of the current block generation node is increased, and the success rate of a malicious attack is reduced.

Embodiment 3

Figure 4:
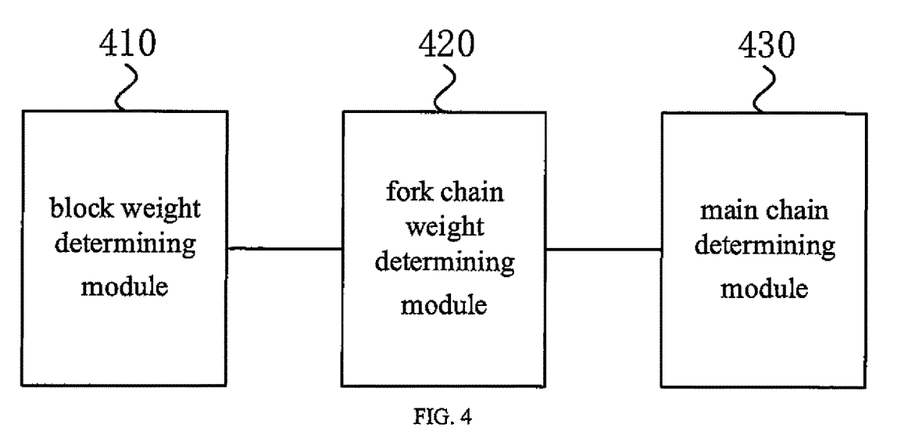
FIG. 4 is a schematic structural diagram of an apparatus for determining a main chain of a blockchain provided in Embodiment 3 of the present disclosure.

FIG. 4 is a schematic structural diagram of an apparatus for determining a main chain of a blockchain provided in Embodiment 3 of the present disclosure. This embodiment may be applied to a situation in which a fork chain is generated in a blockchain to determine the main chain. A method for determining a main chain of a blockchain as described in any embodiment of the present disclosure may be implemented by this apparatus. The apparatus specifically includes: a block weight determining module 410, a fork chain weight determining module 420, and a main chain determining module 430.

The block weight determining module 410 is configured to a weight of each block in each fork chain of the blockchain in response to detecting that at least two fork chains exist the a blockchain.

The fork chain weight determining module 420 is configured to determine a weight of each fork chain according to the weight of each block included in the fork chain.

The main chain determining module 430 is configured to determine a main chain from the fork chains according to the weight of each fork chain, and to roll back the fork chains except for the main chain.

In an embodiment, the block weight determining module 410 includes: an attack type determining unit, a weight rule determining unit, and a block weight determining unit.

The attack type determining unit is configured to determine a target attack type according to block information included in each fork chain.

The weight rule determining unit is configured to determine a target weight setting rule associated with the target attack type according to an association relationship between preset attack types and weight setting rules.

The block weight determining unit is configured to determine the weight of each block in the fork chain according to the target weight setting rule.

In an embodiment, the block weight determining module 410 is further specifically configured to, for any block in the fork chain, set a weight of the block as a first value in response to determining that a block generation node of the block is different from a block generation node of a previous block of the block; set the weight of the current block as the first value in response to determining that the block generation node of the block is the same as the block generation node of the previous block of the block and that the previous block is a fork block; set the weight of the block as a second value in response to determining that the block generation node of the block is the same as the block generation node of the previous block of the block and the previous block is not a fork block.

The first value is greater than the second value.

In an embodiment, the fork chain weight determining module 420 is specifically configured to: sum the weight of each block included in the fork chain to obtain the weight of the fork chain.

In an embodiment, the main chain determining module 430 is specifically configured to: determine the fork chain with a largest weight as the main chain.

In the technical solution of this embodiment, the cooperation between each functional module realizes functions such as, the detection of a fork chain, the determination of an attack type, the associating of the attack type and the weight setting rule, the setting of the block weight, the determination of the weight of the fork chain and the determination of main chain. In this embodiment, by setting different weights for blocks in the fork chains according to the specific conditions of the fork chains, the actual weight of each block in the blockchain is reasonably allocated in advance, thus determining the main chain from the fork chains based on the weights of the fork chains and improving the rationality of determining of the main chain. And the problem of malicious discarding of a tail block of a previous block generation node by a current block generation node during switching of the block generation node is avoided to a certain extent, so that the cost for a malicious attack of the current block generation node is increased, and the success rate of a malicious attack is reduced.

Embodiment 4

Figure 5:
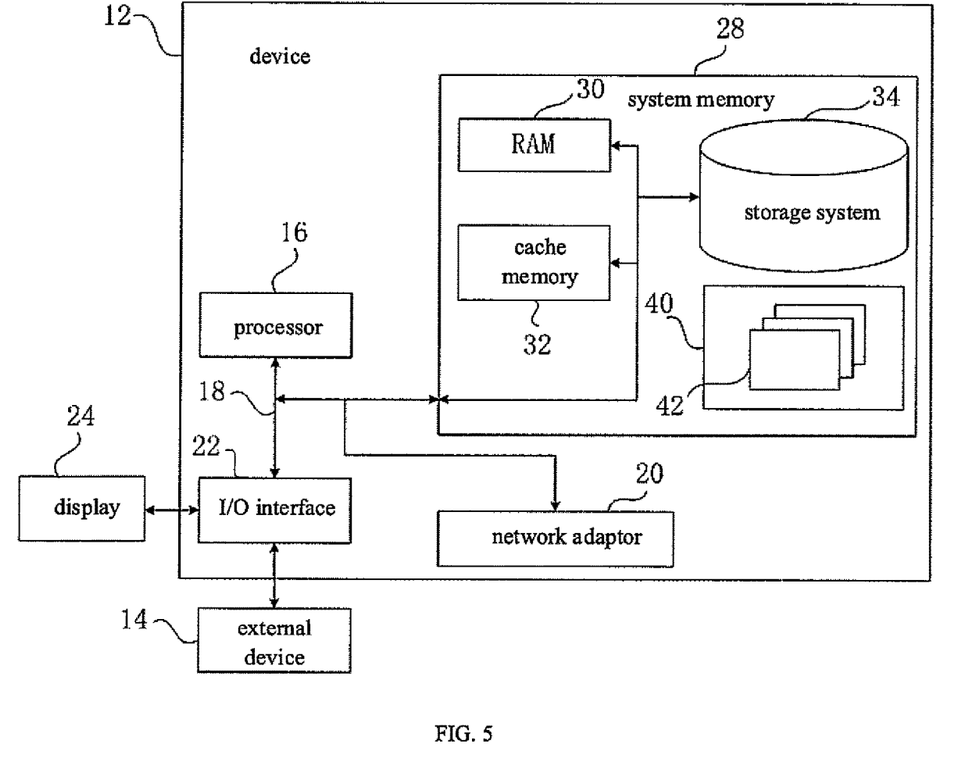
FIG. 5 is a schematic structural diagram of a device provided in Embodiment 4 of the present disclosure.

FIG. 5 is a schematic structural diagram of a device provided by Embodiment 4 of this embodiment, and FIG. 5 illustrates a block diagram of an exemplary device suitable for carrying out an implementation of this embodiment. The device shown in FIG. 5 is only an example, and should not impose any limitation on the functions and usable range of this embodiment.

The device 12 shown in FIG. 5 is only an example, and should not impose any limitation on the function and usable range of embodiments of the present disclosure.

As shown in FIG. 5, the device 12 is represented in the form of a general-purpose computing device. The components of the device 12 may include, but are not limited to, one or more processors or processing units 16, a system memory 28, and a bus 18 connecting different system components (including the system memory 28 and the processing unit 16).

The bus 18 represents one or more of several types of bus structures, including a memory bus or a memory controller, a peripheral bus, a graphics acceleration port, a processor, or a local area bus using any of a variety of bus structures. By way of example, these architectures include, but are not limited to, the Industry Standard Architecture (ISA) bus, the Micro Channel Architecture (MAC) bus, the enhanced ISA bus, the Video Electronics Standards Association (VESA) local area bus, and peripheral component interconnects (PCI) bus.

The device 12 typically includes a variety of computer system-readable media. These media may be any available media that may be accessed by the device 12, including volatile and non-volatile media, removable and non-removable media.

System memory 28 may include computer system readable media in the form of volatile memory, such as random access memory (RAM) 30 and/or cache memory 32. The device 12 may further include other removable/non-removable, volatile/nonvolatile computer system storage media. Only as an example, the storage system 34 may be used to read and write non-removable, non-volatile magnetic media (not shown in FIG. 5 and is commonly referred to as a "disk drive"). Although not shown in FIG. 5, a disk drive for reading and writing to a removable non-volatile disk (e.g., a "floppy disk"), and a removable non-volatile optical disk (e.g., a CD-ROM, DVD-ROM or other optical media) may be provided. In these cases, each drive may be connected to the bus 18 through one or more data medium interfaces. The memory 28 may include at least one program product having a set (for example, at least one) of program modules configured to perform the functions of various embodiments of the present disclosure.

The program/utility tool 40, having a set (at least one) of program modules 42, may be stored in, for example, the memory 28. Such program modules 42 include, but are not limited to, an operating system, one or more application programs, other program modules, and programs data, each or some combination of these examples may include an implementation of the network environment. The program module 42 generally performs functions and/or methods in the embodiments described in embodiments of the present disclosure.

The device 12 may also communicate with one or more external devices 14 (e.g., a keyboard, a pointing device, a display 24, etc.), and may also communicate with one or more devices that enable a user to interact with the device 12, and/or communicate with any device (e.g., a network card, modem, etc.) that enable the device 12 to communicate with one or more other computing devices. Such communication may be performed through an input/output (I/O) interface 22. Moreover, the device 12 may also communicate with one or more networks (e.g., a local area network (LAN), a wide area network (WAN), and/or a public network, e.g., the Internet) through the network adapter 20. As shown in the figure, the network adapter 20 communicates with other modules of the device 12 via the bus 18. It should be understood that although not shown in the figure, other hardware and/or software modules may be used in conjunction with the device 12, including but not limited to: microcode, device drivers, redundant processing units, external disk drive arrays, RAID systems, tape drives, and data backup storage system.

The processing unit 16 executes various functional applications and data processing by running a program stored in the system memory 28, for example, a method for implementing a method for determining a main chain of a blockchain provided by an embodiment of the present disclosure.

Embodiment 5

The Embodiment 5 of the present disclosure also provides a computer-readable storage medium having stored computer programs (or computer-executable instructions) thereon which, when executed by a processor, implement a method for determining a main chain of a blockchain. The method includes:

determining a weight of each block in each fork chain of the blockchain in response to detecting that at least two fork chains exist in the blockchain;

determining a weight of each fork chain according to the weight of each block included in the fork chain; and determining a main chain from the fork chains according to the weight of each fork chain, and rolling back the fork chains except for the main chain.

The computer storage medium in the embodiment of the present disclosure may adopt any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination thereof. More specific examples (non-exhaustive list) of computer-readable storage media include: electrical connections with one or more wires, portable computer disks, hard disks, random access memory (RAM), read-only memory (ROM), Erasable programmable read-only memory (EPROM or flash memory), optical fiber, portable compact disk read-only memory (CD-ROM), optical storage device, magnetic storage device, or any suitable combination of the foregoing. In this document, a computer-readable storage medium may be any tangible medium that contains or stores a program that may be used by or in combination with an instruction execution system, apparatus, or device.

The computer-readable signal medium may include a data signal in baseband or propagated as part of a carrier wave, which carries a computer-readable program code. Such a propagated data signal may take many forms, including but not limited to electromagnetic signals, optical signals, or any suitable combination of the foregoing. The computer-readable signal medium may also be any computer-readable medium other than a computer-readable storage medium, and the computer-readable medium may send, propagate, or transmit a program for use by or in connection with an instruction execution system, apparatus, or device.

Program codes embodied on a computer-readable medium may be transmitted using any appropriate medium, including but not limited to wireless, wires, optical fiber cable, RF, etc., or any suitable combination of the foregoing.

The computer program codes for performing the operations of the embodiments of the present disclosure may be written in one or more programming languages or a combination thereof, the programming language including an object-oriented programming language such as Java, Smalitalk, C++, and also including regular procedural programming language such as "C" or similar programming language. The program codes may be executed entirely on the user's computer, partly on the user's computer, as an independent software package, partly on the user's computer and partly on a remote computer, or entirely on a remote computer or device. In the case of a remote computer, the remote computer may be connected to the user's computer through any kind of network, including a local area network (LAN) or a wide area network (WAN), or it may be connected to an external computer (for example, connected through the Internet by the Internet provider).

What is claimed is:

1. A method for determining a main chain of a blockchain, comprising:
   determining a weight of each block in each fork chain of the blockchain based on a block generation node of each block in each fork chain in response to detecting that at least two fork chains exist in the blockchain;
   determining a weight of each fork chain according to the weight of each block included in the fork chain;
   determining a main chain from the fork chains according to the weight of each fork chain, and rolling back the fork chains other than the main chain;
   wherein determining the weight of each block in each fork chain comprises, for any block in the fork chain,
   setting a weight of the block as a first value in response to determining that a block generation node of the block is different from a block generation node of a previous block of the block;
   setting the weight of the block as the first value in response to determining that the block generation node of the block is the same as the block generation node of the previous block of the block and that the previous block is a fork block; and
   setting the weight of the block as a second value in response to determining that the block generation node of the block is the same as the block generation node of the previous block of the block and that the previous block is not a fork block;
   wherein the first value is greater than the second value.

2. The method of claim 1, wherein determining the weight of each block in each fork chain comprises:
   determining a target attack type according to block information included in the fork chain;
   determining a target weight setting rule associated with the target attack type according to an association relationship between preset attack types and weight setting rules; and
   determining the weight of each block in the fork chain according to the target weight setting rule.

3. The method of claim 1, wherein determining the weight of each fork chain according to the weight of each block included in the fork chain comprises:
   summing the weight of each block included in the fork chain to obtain the weight of the fork chain.

4. The method of claim 1, wherein determining the main chain from the fork chains according to the weight of each fork chain comprises:
   determine the fork chain with a largest weight as the main chain.

5. A device, comprising:
   one or more processors;
   a memory configured to store one or more programs;
   when the one or more programs are executed by the one or more processors, the one or more processors are caused to carry out a method for determining a main chain of a blockchain comprising:
   determining a weight of each block in each fork chain of the blockchain based on a block generation node of each block in each fork chain in response to detecting that at least two fork chains exist in the blockchain;
   determining a weight of each fork chain according to the weight of each block included in the fork chain;
   determining a main chain from the fork chains according to the weight of each fork chain, and rolling back the fork chains other than the main chain;
   wherein determining the weight of each block in each fork chain comprises, for any block in the fork chain,
   setting a weight of the block as a first value in response to determining that the block generation node of the block is different from a block generation node of a previous block of the block;
   setting the weight of the block as the first value in response to determining that the block generation node of the block is the same as the block generation node of the previous block of the block and that the previous block is a fork block; and
   setting the weight of the block as a second value in response to determining that the block generation node of the block is the same as the block generation node of the previous block of the block and that the previous block is not a fork block;
   wherein the first value is greater than the second value.

6. The device of claim 5, wherein determining the weight of each block in each fork chain comprises:
   determining a target attack type according to block information included in the fork chain;
   determining a target weight setting rule associated with the target attack type according to an association relationship between preset attack types and weight setting rules; and
   determining the weight of each block in the fork chain according to the target weight setting rule.

7. The device of claim 5, wherein determining the weight of each fork chain according to the weight of each block included in the fork chain comprises:
   summing the weight of each block included in the fork chain to obtain the weight of the fork chain.

8. The device of claim 5, wherein determining the main chain from the fork chains according to the weight of each fork chain comprises:
   determine the fork chain with a largest weight as the main chain.

9. A non-transitory computer-readable storage medium having a computer program stored thereon which, when is executed by a processor, the processor is caused to carry out a method for determining a main chain of a blockchain comprising:
   determining a weight of each block in each fork chain of the blockchain based on a block generation node of each block in each fork chain in response to detecting that at least two fork chains exist in the blockchain;

determining a weight of each fork chain according to the weight of each block included in the fork chain;

determining a main chain from the fork chains according to the weight of each fork chain, and rolling back the fork chains other than the main chain;

wherein determining the weight of each block in each fork chain comprises, for any block in the fork chain, setting a weight of the block as a first value in response to determining that the block generation node of the block is different from a block generation node of a previous block of the block;

setting the weight of the block as the first value in response to determining that the block generation node of the block is the same as the block generation node of the previous block of the block and that the previous block is a fork block; and setting the weight of the block as a second value in response to determining that the block generation node of the block is the same as the block generation node of the previous block of the block and that the previous block is not a fork block;

wherein the first value is greater than the second value.

10. The non-transitory computer-readable storage medium of claim 9, wherein determining the weight of each block in each fork chain comprises:

determining a target attack type according to block information included in the fork chain;

determining a target weight setting rule associated with the target attack type according to an association relationship between preset attack types and weight setting rules; and determining the weight of each block in the fork chain according to the target weight setting rule.

11. The non-transitory computer-readable storage medium of claim 9, wherein determining the weight of each fork chain according to the weight of each block included in the fork chain comprises:

summing the weight of each block included in the fork chain to obtain the weight of the fork chain.

12. The non-transitory computer-readable storage medium of claim 9, wherein determining the main chain from the fork chains according to the weight of each fork chain comprises:

determine the fork chain with a largest weight as the main chain.

* * * * *